United States Patent [19]

Yourkowski et al.

[11] Patent Number: 4,573,649
[45] Date of Patent: Mar. 4, 1986

[54] INTEGRATED ALTERNATE GEAR EXTENSION AND GROUND-CREW DOOR OPENING/CLOSING SYSTEM FOR AN AIRCRAFT

[75] Inventors: Frank M. Yourkowski, Enumclaw; Melvin C. Zoerb, Renton, both of Wash.

[73] Assignee: The Boeing Company, Seattle, Wash.

[21] Appl. No.: 519,251

[22] Filed: Aug. 1, 1983

[51] Int. Cl.$^4$ .............................................. B64C 25/26
[52] U.S. Cl. ................................................ 244/102 R
[58] Field of Search ................ 244/75 R, 1 R, 100 R, 244/102 R, 102 SL, 50, 137 R

[56] References Cited

U.S. PATENT DOCUMENTS

| | | |
|---|---|---|
| 2,452,251 | 10/1948 | Martin . |
| 2,452,787 | 11/1948 | Patch . |
| 2,489,411 | 11/1949 | Harrington . |
| 2,701,695 | 2/1955 | Irwin . |
| 3,107,886 | 10/1963 | Bossler, Jr. . |
| 3,652,039 | 3/1972 | Lucien . |
| 3,776,492 | 12/1973 | Iben .................................. 244/137 R |
| 4,007,890 | 2/1977 | Bremer et al. ........................ 244/50 |

FOREIGN PATENT DOCUMENTS 489414 1/1953 Canada ............................ 244/102 R Primary Examiner—Galen L. Barefoot
Attorney, Agent, or Firm—Christensen, O'Connor, Johnson, & Kindness

[57] ABSTRACT

In an aircraft having an alternate gear extension system as a backup for use by the pilot in the event of failure of the main gear extension system, a ground-crew operated subsystem is integrated with the pilot's alternate gear extension equipment for enabling the ground-crew to open and close the gear door by controls accessible on the underside of the aircraft fuselage. The integration of these two functions involves dual use of certain of the electrical and hydraulic components so that frequent and scheduled operation of the door opening function by ground-crew personnel automatically exercises the alternate gear extension mode to ensure its operability as a safety backup to the main gear extension system. The added components of the ground-crew door control function include a safety valve and an associated safety valve latch that prevent subsequent and unexpected door closure under conditions in which hydraulic actuator pressure is not available at the instant a door is commanded closed, but becomes available at a subsequent time.

10 Claims, 6 Drawing Figures

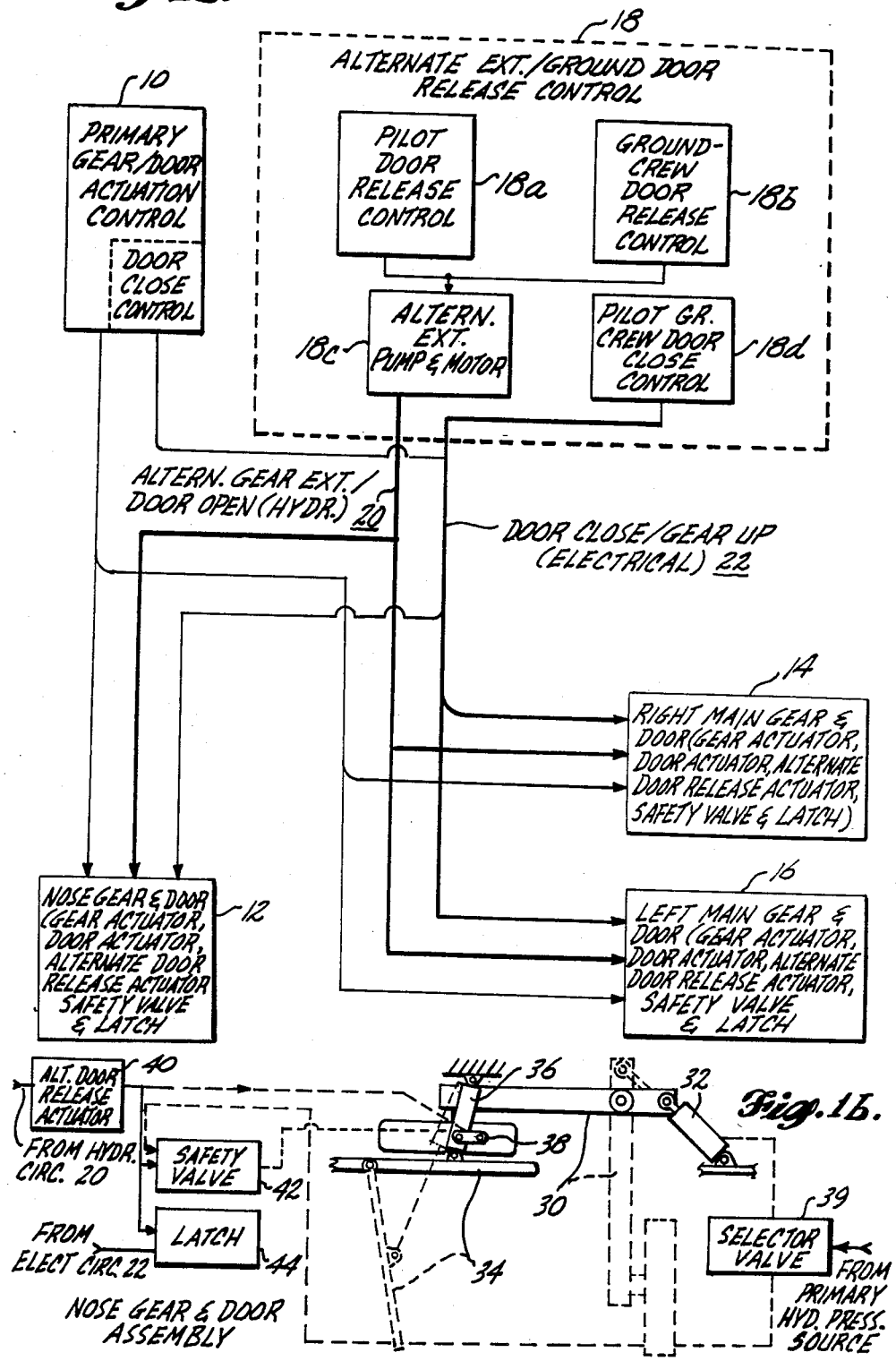

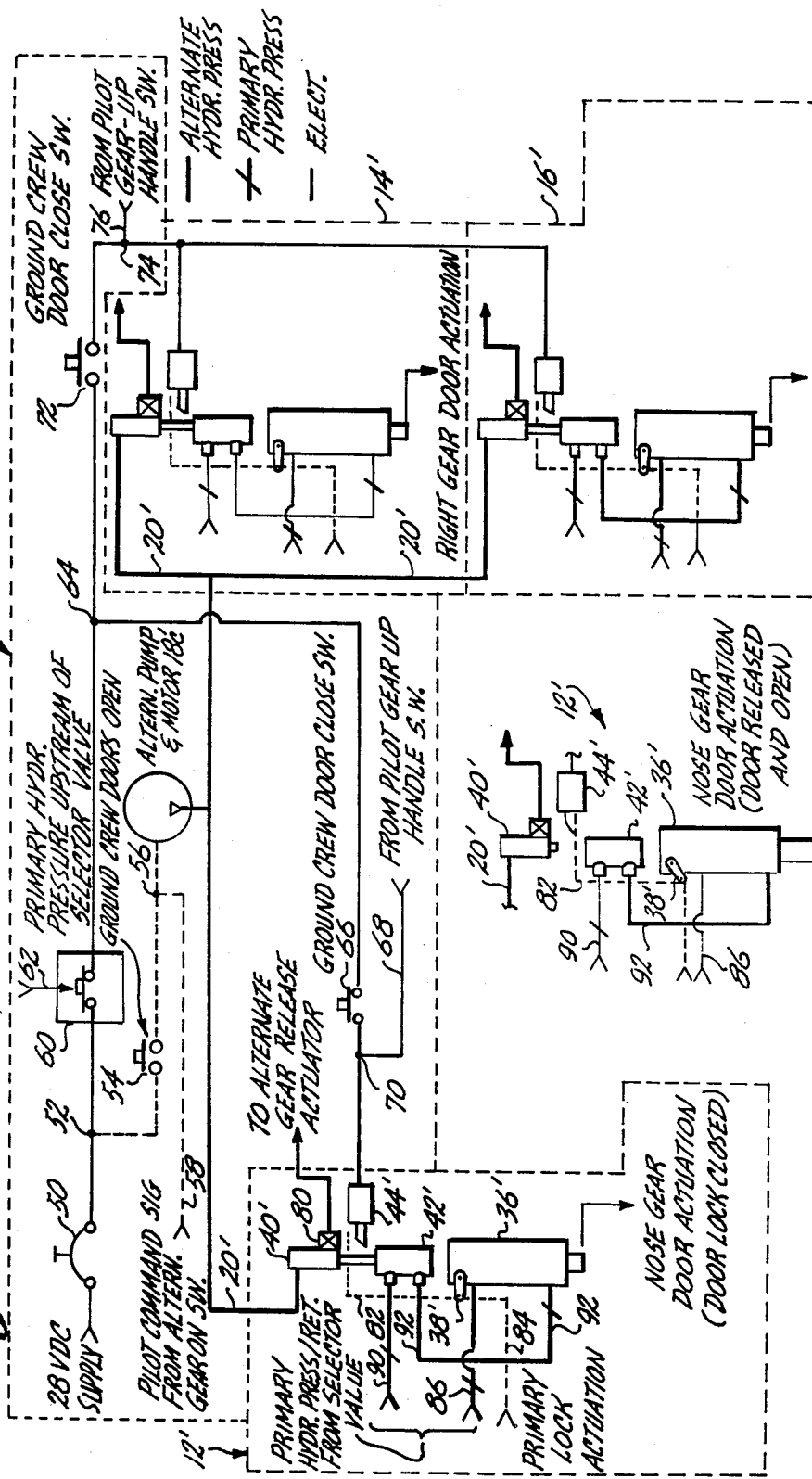

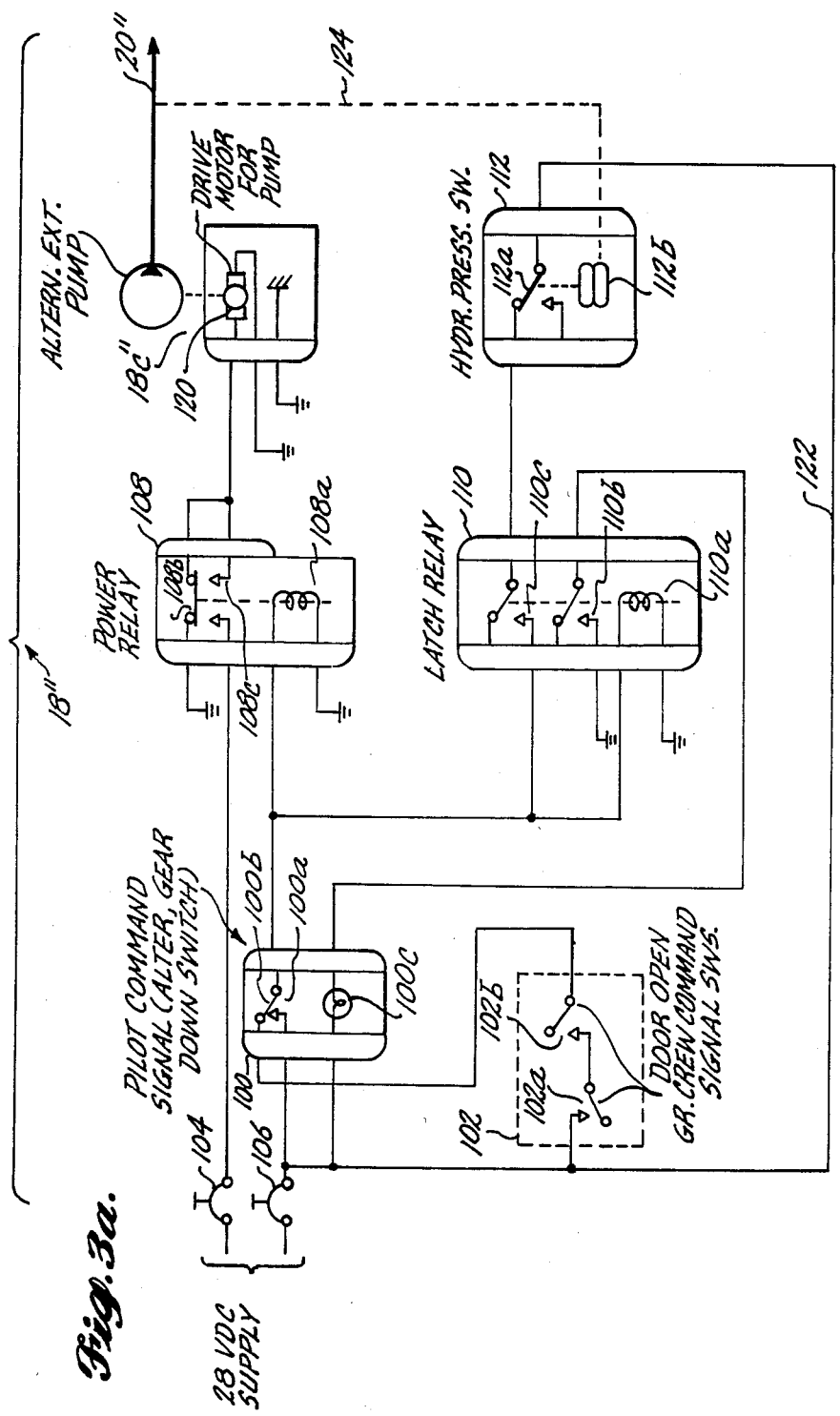

INTEGRATED ALTERNATE GEAR EXTENSION AND GROUND-CREW DOOR OPENING/CLOSING SYSTEM FOR AN AIRCRAFT

BACKGROUND OF THE INVENTION

The invention relates in general to automatic and semiautomatic gear and gear door extension/retraction systems, and more particularly to systems having pilot operated, alternate (backup) gear extension.

Two separate gear and gear door control systems are provided on modern commercial transport aircraft. A first of these systems is called the alternate gear extension system which provides a pilot backup to the primary gear and gear door extension control. Should the primary gear extension system fail, the alternate extension system can be used by a pilot to free the gear door and allow the gear to fall by gravity (or, in some cases, by an auxiliary gear release actuator) into an extended, prelanding condition. Early alternate extension systems included cables and associated mechanical levers and catches controlled from the cockpit. More recent innovations have replaced the traditional cable actuating system with hydraulics and electro-hydraulics in which the hydraulic components are similar to a car braking system. Since the alternate gear extension is a safety backup, which is not normally needed, the hydraulic components of the system are not frequently exercised and, hence, there is an increased chance of some trouble developing in the hydraulic system, for example, a dry seal, which could cause the system to malfunction. This is analogous to the increased probability of failure of the hydraulics of a vehicle's brakes after a prolonged period of non-use.

As a previously separate subsystem of the aircraft, many modern transports are equipped with a gear door release that can be actuated by the ground-crew working beneath the belly of the aircraft to cause the gear doors to open for access to the wheel wells. It will be noted that the gear and gear door (or doors) operate in a coordinated sequence on approach to landing in which the gear door is first opened, followed by the extension of the landing gear, and completed by the reclosing of the gear door. Thus, when the aircraft is on the ground with gears extended, the gear doors are closed and must be opened in order to facilitate maintenance by the ground-crew. As mentioned, many aircraft are equipped with a subsystem for causing the gear doors to open in response to a switch or latch located near the door on the belly of the aircraft and accessible by the ground-crew. This same subsystem includes means for operating the door closing actuator to close the door when the maintenance task has been completed. In the prior systems for ground-crew release (and subsequent closure) of the gear doors, an entirely mechanical linkage has been used to connect a release/close handle on the aircraft's underside to a lever lock on the gear door actuator, and this mechanical means is accompanied by a significant weight penalty.

SUMMARY OF THE INVENTION

In accordance with the preferred embodiment of the invention, the functions of pilot operated alternate gear extension and ground-crew gear door opening/closing are integrated in a system that is responsive to either a pilot command from the flight deck to cause door opening and gear extension, or to the actuation of electrical control switches on the belly of the aircraft by the ground-crew to effect door opening/closing for facilitating ground maintenance. The shared components of the integrated system include a door actuator for moving a gear door between a locked, closed condition and a released, opened condition, a door actuator lock and an associated alternate lock release actuator that unlocks the door actuator so that the door will open by force of gravity, or by force of hydraulic pressure applied to the door actuator. The alternate lock release actuator is responsive to a pilot command from the flight deck to cause the door actuator lock to unlock the door actuator for opening the gear door and, hence, allowing the gear to extend, such as under emergency backup circumstances in which the primary gear operating system has malfunctioned. Additionally, the alternate lock release actuator is responsive to a command from switches located on the belly of the aircraft and accessible to the ground-crew to again cause the door actuator lock to be unlocked so that the door actuator and door are free to fall open by gravity (or to be driven open by hydraulic operating pressure).

Additionally, the preferred embodiment includes a safety valve and an associated safety valve latch which are interconnected with the alternate lock release actuator and a hydraulic circuit that applies door closing pressure to the door actuator to ensure that once the gear doors have been opened, they can be closed by an electrical switch command only when hydraulic pressure is available for immediately responding to the door closing command, and not at a later and unexpected time when door closing hydraulic pressure suddenly reappears, for example, when the aircraft's systems are reactivated after a shutdown.

By the integration of these two subsystems, the alternate gear extension system is frequently, and on a scheduled basis, exercised each time the ground-crew, during routine maintenance, opens the gear doors using the door opening command switches located on the belly of the aircraft. The frequent and regular usage of the alternate extension system increases the system reliability and the confidence in the hydraulics of such system as a safety backup. Furthermore, a significant weight savings is achieved by eliminating the previously separate components used in the stand-alone system for ground-crew door release. Also, the safety valve and safety valve latch used in the integrated system ensures that the gear doors close only immediately on command of the ground-crew, when they are prepared for such closure, and not at an unexpected time, long after the door closing switch has been operated and when hydraulic pressure is suddenly restored during a startup of the aircraft's systems. As another safety factor, the integration of the alternate extension and ground-crew door release subsystems simplifies the implementation of a safety override commanded by the pilot from the flight deck after takeoff in order to close the gear doors should they be inadvertently left in the open position.

Thus, in summary, the integrated subsystems provide safety, weight savings and reliability not heretofore available in the prior, separate systems.

To provide a complete disclosure of the invention, reference is made to the appended drawings and following description of one particular and preferred embodiment.

BRIEF DESCRIPTION OF THE DRAWINGS

FIG. 1a is a generalized block diagram of the integrated, alternate extension and ground-crew door opening/closing system in accordance with a preferred embodiment of the invention.

FIG. 1b is a schematic diagram detailing the nose gear, door, actuators and related components shown more generally in the block diagram of FIG. 1a.

FIG. 2a is a schematic diagram of one embodiment of the integrated system shown generally by FIGS. 1a and 1b.

FIG. 2b is a detailed diagram of the nose gear door actuator subassembly taken from FIG. 2a and shown in a moved condition, namely, in the door released and open position.

FIGS. 3a and 3b together show a detailed schematic diagram of another, and currently preferred, embodiment of the integrated system shown generally in the block diagram of FIG. 1.

DETAILED DESCRIPTION OF THE PREFERRED AND ALTERNATIVE EMBODIMENTS

Figure 3B:
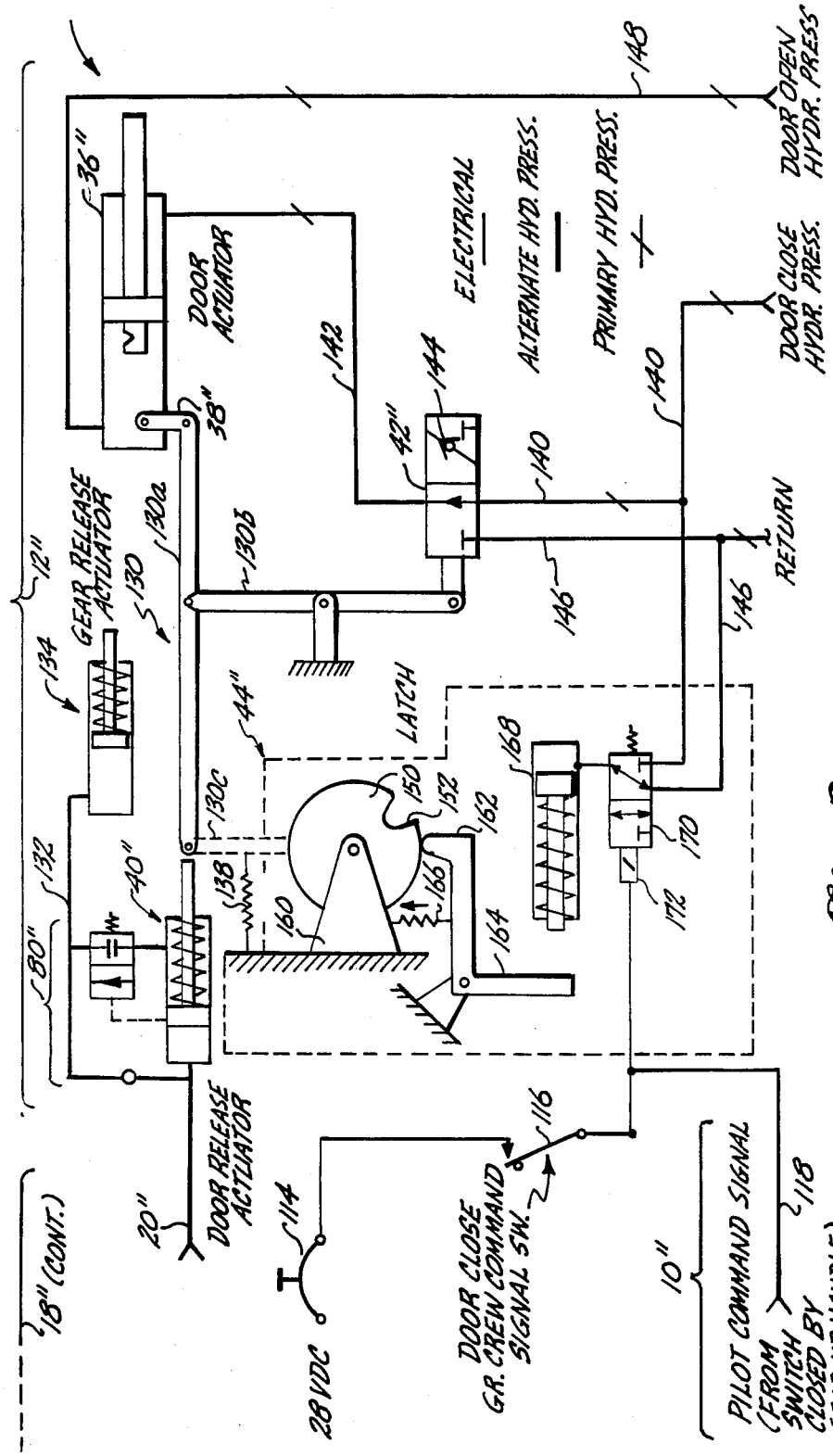

With reference to FIG. 1a, the integrated, alternate gear extension and ground-crew door opening/closing subsystems are shown in block diagram form in the environment of a complete gear and gear door control system. In this overall system, the landing gears and associated doors are extended and retracted by a primary gear/door actuation control 10 that is electro-hydraulically coupled to the nose gear and door assembly 12, a right main gear and door assembly 14 and a left main gear and door assembly 16. Under normal takeoff, flight and landing conditions, control 10 will be the primary control interface between the pilot and the assemblies 12, 14 and 16. As a safety feature backing up the primary control 10, an alternate door release and gear extension subsystem is provided, and integrated, according to the invention, with a ground-crew door release in control 18. Control 18 is coupled to the gear and door assemblies 12, 14 and 16 by both an alternate hydraulic circuit indicated at 20 and an electrical circuit indicated at 22. As described in further detail below, hydraulic circuit 20 is responsive to the operation of control 18, commanded either by the pilot (pilot control circuit 18a) as part of the alternate extension backup, or by ground-crew personnel (ground-crew control circuit 18b) during maintenance, to cause the gear door to be released by a hydraulic command (alternate extension pump and motor 18c) separate from the primary gear and gear door hydraulics and sent over circuit 20 to assemblies 12, 14 and 16. In the alternate extension mode, the pilot causes pump and motor 18c of control 18 to pressurize the alternate hydraulic circuit 20 to unlock the gear doors and cause the landing gears to be deployed either by gravity or by an auxiliary gear release actuator. In the present embodiment and as described more fully below, once the gear door has been released, the gear will be automatically extended by a hydraulic delay sequencer that powers an alternate gear release actuator after the alternate door release actuator releases the gear door.

When the aircraft is grounded and resting on the extended gears, control 18 also serves to enable the ground-crew to release the gear doors by initating a ground-crew door release command in the form of an electrical signal which pressurizes the hydraulic circuits 20. Ground-crew control switches are provided on the belly of the aircraft fuselage for this purpose. With the aircraft gears already extended, pressurization of circuit 20 simply causes the gear doors to be released and allowed to fall by gravity (or by hydraulic pressure) to an open position, affording access to the wheel wells by the maintenance crew.

To close the gear doors of the grounded aircraft, a ground-crew door close command is initiated in the form of an electrical signal over circuit 22 from control 18d, which causes a latch reset response in each of assemblies 12, 14 and 16 to power the door to a closed position. Also, control 10 may be provided, as in the present embodiment, with a corresponding latch reset mode by which a pilot initiated electrical command signal is applied over circuit 22 to each of assemblies 12, 14 and 16 to enable primary operation of the gear and gear door in a coordinated motion sequence of opening the gear door, retracting the gear and then closing the gear door.

With reference to FIG. 1b, a more detailed schematic shows the principal components of the nose gear and door assembly 12. Specifically, in FIG. 1b, assembly 12 includes a landing gear 30 movable between a retracted (solid lines) position and an extended (dotted lines) position by gear actuator 32. The gear door 34 is similarly moved between a closed (solid lines) position and an open (dotted lines) position by a door actuator 36. Actuator 36 includes a door actuator lock 38, which normally and in this embodiment is physically mounted on the body of actuator 36 for locking the door in its closed position. To allow the door 34 to move to its open position, either under a powered operation of actuator 36 or by the force of gravity, lock 38 must be released by a mechanical movement. In the primary gear and door operating mode lock 38 is shifted by a primary lock release actuator (not shown). The primary hydraulic pressure for powered operation of actuators 32 and 36 is supplied via selector valve 39 as part of the existing components of nose gear and door assembly 12 for selectively applying primary hydraulic pressure and the return therefore to gear actuator 32 and door actuator 36 to effect coordinated movements of the gear and gear door as discussed above. The primary hydraulic pressure is also used to close the gear door in response to ground-crew command switches.

The above-described components of assembly 12 in FIG. 1b are present in existing gear and gear door assemblies and in each of the assemblies 14 and 16 shown in block form in FIG. 1a. To implement the integrated alternate extension and ground-crew door release control 18 of FIG. 1a, each of assemblies 12, 14 and 16 further include, as shown in FIG. 1b, an alternate door release actuator 40, a safety valve 42 and a latch 44 acting in combination with actuator 36 and actuator lock 38 to allow the door actuator to be released from its locked condition under all circumstances, but to prevent powered closure of the door by actuator 36 under certain contingencies, for safety purposes, as described in greater detail below.

With reference to FIG. 2a, one embodiment of the invention is shown in a detailed schematic diagram to include a control 18' and nose, right and left main gear and door assemblies 12', 14' and 16', respectively, corresponding to like unprimed numbered subsystems in the general showing of FIG. 1a. Thus, control 18' in FIG. 2a includes a 28 VDC source connected through a circuit breaker 50 to a circuit junction 52 where the circuit divides into first and second branches. A first branch includes a normally open, momentary contact switch 54, accessible to and operable by the ground-crew to cause the gear doors to unlock by energizing alternate extension pump and motor 18c'. For this purpose, the normally open contacts of switch 54 are connected in series between junction 52 and the pump motor as illustrated. Normally, switch 54 will be located on the belly of the aircraft body at a convenient location near one of the gear doors. In this embodiment, a single switch 54 effects opening of all of the gear doors by pressurizing hydraulic circuit 20' connected to the alternate extension pump and motor 18c'. Control 18' also provides for a pilot command signal from the flight deck indicated in FIG. 2a as a circuit lead 58 connected to a junction 56 between switch 54 and pump and motor 18c'. In response to the pilot command, a 28 VDC supply signal is applied to junction 56 from the flight deck instead of the 28 VDC supply signal controlled by the ground-crew door open switch 54. The pilot command signal on lead 58 is produced by a switch located on the flight deck and operable by the pilot for selecting the alternate gear extension function.

In the other circuit that branches from junction 52, the 28 VDC supply voltage via breaker 50 is connected to a series of switches for effecting gear door closure. For this purpose, a pressure sensing switch 60 determines that the primary hydraulic circuit is pressurized; that is, the subsystem of the aircraft for supplying the normal hydraulic pressure for operating the gears and gear doors is turned on and operative. A hydraulic input 62 of switch 60 is connected to the primary hydraulic circuit upstream of selector valve 39 (see FIG. 1b). As long as primary hydraulic pressure is present, the contacts of switch 60 will be closed, completing a series circuit from junction 52 through switch 60 to a downstream circuit junction 64. At junction 64, the circuit again divides into a subbranch that is connected through a ground-crew door closing switch 66 to an electromechanical latch 44' of nose gear door assembly 12'. Switch 66 is of the normally open, momentary contact-type and is mounted along with the door open switch 54 on the belly of the aircraft so as to be accessible by the ground-crew. Closing of switch 66 causes latch 44' to be released from a previously latched condition if primary pressure is available as sensed by switch 60, thereby allowing the primary hydraulic pressure circuit to power the gear door to its closed position as described below. Alternatively, from the flight deck, a pilot gear-up command can also cause a releasing of the latched condition, and, for this purpose, a signal from the pilot gear-up handle switch (not shown) applies a 28 VDC command signal via lead 68 to a junction 70 located between switch 66 and latch 44' of assembly 12'. The other sub-branch of control 18' extends from junction 64 to a series switch 72 of the normally open, momentary contact-type for performing a similar door closing function in combination with right and left gear and door assemblies 14' and 16' as described above for switch 66 and the nose gear and door assembly 12'. Likewise, a pilot gear-up command is applied to a junction 74 between switch 72 and the latches of assemblies 14' and 16' for receiving a gear-up signal from the pilot gear-up handle switch (not shown) that is applied over lead 76 to effect closing of the right and left gear doors similarly to the above-described nose gear and door assembly 12' operation.

Assemblies 12', 14' and 16' are substantially the same and they will thus be described by reference to assembly 12', which is shown to include a door actuator 36' having a door lock 38', an alternate door release actuator 40', a safety valve 42' and a safety latch 44'. These components corresond to like numbered, but unprimed, components of the nose gear and door assembly 12 shown in FIG. 1b. Also, assembly 12' includes a hydraulic sequence delay 80 that cooperates with actuator 40' for effecting a delayed response to the alternate extension hydraulic pressure applied over circuit 20' to operate an alternate gear release actuator (not shown). Delay 80 is provided in this embodiment to accommodate those aircraft that are equipped with an alternate gear release actuator to first enable the gear door to be released by actuator 40' in response to a pilot command, as described above, followed by a delayed operation of a gear release actuator via delay 80. For those aircraft not equipped with a separate gear lock and, hence, lacking an alternate gear release actuator, the gear door is released by actuator 40' to fall to an open position and the gear itself automatically falls by gravity to an extended position.

The operation of control 18' and assemblies 12', 14' and 16' is as follows. During flight, should the primary gear door extension system malfunction, a pilot command signal from the alternate gear extension switch is applied over lead 58 in control 18' to start alternate pump and motor 18c', which pressurizes the alternate hydraulic circuit 20'. The pressure in circuit 20' drives the nose gear door release actuator 40' and corresponding actuators in assemblies 14' and 16' to mechanically move the lever of door actuator lock 38' to an unlocked position via linkage 82. Normally, lock 38' is operated over the primary lock actuation linkage 84 that is a component of the primary gear extension system. With actuator door lock 38' moved to an unlocked condition, actuator 36', either in a powered response or by the weight of gravity, moves to a nose gear door open position as depicted in FIG. 2b. It is noted that actuator 36', when unlocked, will allow the nose gear door to open by gravity even though there is a loss of primary hydraulic pressure at the door opening primary hydraulic port 86 of actuator 36'. In sequence with the opening of the nose gear door initiated by actuator 40', hydraulic delay 80 then causes the alternate gear release actuator to operate to release the nose gear for its extension. As mentioned above, on those aircraft not equipped with a separate gear lock, the gear will deploy automatically by the force of gravity once the gear door has been released.

At the same time that actuator 40' releases lock 38', it also sets safety valve 42' so as to block the primary hydraulic circuit from causing powered closure of actuator 36' via primary hydraulic line 90 and hydraulic line 92 that is connected to the door closing port on door actuator 36'. A check valve (described in the embodiment of FIG. 3b) in safety valve 42' allows return hydraulic fluid to be forced back through line 92 and valve 42' to line 90 as actuator 36' moves to the door opened position. When actuator 40' is fully extended to release lock 38', the electromechanical latch 44' latches valve 42' in its set and safe position. By latching valve 42' in this position, actuator 36' cannot be driven to the door closed position via line 90, valve 42' and line 92 until latch 44' has been released and valve 42' returned to an armed position. This is a safety feature having great importance during ground-crew control of the gear doors as described below.

To open the gear doors when the aircraft is on the ground and is being serviced by maintenance personnel, switch 54 of control 18' located on the aircraft's belly, is operated manually by the ground-crew, to energize alternate extension pump and motor 18c'. Hydraulic circuit 20' is thus pressurized, as described above, to cause actuator 40' of the nose gear assembly 12' and corresponding actuators in assemblies 14' and 16' to release the associated gear doors by means of releasing actuator lock 38'. Since the gear itself is already in the down position, the hydraulic delay 80 connected to the alternate gear release actuator has no effect. At the same time that actuator 40 operates lock 38', safety valve 42' is displaced from its armed position to its set position, and latch 44' assumes its latched condition as described above. The nose gear door and the right and left main gear doors are now open, affording access to the gear wells.

After performing the required maintenance within the gear wells, the gear doors are powered to a closed position by manual operation of the ground-crew door close switches 66 and 72. With reference to the nose gear and door assembly 12', the operation of switch 66 unlatches the electromechanical latch 44', allowing safety valve 42' to move from a set safe position (FIG. 2b) to its armed position (FIG. 2a). When valve 42' is returned to the safe position, as shown in FIG. 2a, at a time when primary hydraulic pressure is present from selector valve 39 (FIG. 1b), hydraulic pressure in line 90 is applied through valve 42' and hydraulic line 92 to the door closing side of door actuator 36' powering the door to its closed position.

As a safety feature, latch 44', safety valve 42' and pressure sensing switch 60 in control 18' ensure that the actuator 36' and the associated nose gear door are closed, if at all, immediately in response to the ground-crew operation of switch 66. If primary hydraulic pressure is not available, due, for example, to shutdown of the aircraft's hydraulic system, the switch 60 will be open, preventing the 28 VDC supply voltage from being applied to the latch 44' through switch 66 when it is momentarily operated by the ground-crew. In this circumstance, latch 44' remains in its latched condition holding valve 42' in the set and safe position (FIG. 2b), and holding the nose gear door open. When primary hydraulic pressure comes on line, due, for example, to reactivation of the aircraft's systems, latch 44' is still in its latched condition holding valve 42' in its set and safe condition, thereby preventing the application of door closing hydraulic pressure through lines 90 and 92 to the door closing side of actuator 36'. To close the door the ground-crew must again operate switch 66 when the primary hydraulic pressure is present to initiate the above-described sequence that causes actuator 36' to close the gear door. By this feature, powered closure of the gear door occurs with full ground-crew awareness, only as an immediate and anticipated response to operation of the ground-crew door closing switches, and not at a subsequent, unexpected time when the primary hydraulic pressure is restored. The operation of switch 72 for the right and left main gear doors of assemblies 14' and 16', respectively, is the same as described above for switch 66 and assembly 12'.

Door closing can also be commanded by the pilot from the flight deck using the pilot gear-up handle switch (not shown) to apply a 28 VDC control signal to leads 68 and 76 to release latch 44' and the corresponding latches in assemblies 14' and 16'.

By the foregoing arrangement of control 18' and gear and door actuation assemblies 12', 14' and 16', the shared components for the alternate gear extension and ground-crew door release functions afford a considerable weight savings and reliability advantage over the prior, separate systems that individually performed these functions. Moreover, the opening of the ground doors by the actuation of the alternate extension pump and motor 18c' provides a frequent and scheduled operational check and exercising of the critical part of the alternate gear extension system. By frequently exercising the alternate extension pump and motor 18c', as well as the release actuator 40', a greatly increased reliability factor is efficiently built into the aircraft system.

With reference to FIGS. 3a and 3b, a currently preferred embodiment of the invention is shown to include an alternate extension ground-crew door release control 18" cooperating with a gear and door actuation assembly 12", corresponding, for example, to control 18 and the nose gear and door assembly 12 of FIG. 1a. It will be appreciated that control 18", as shown in FIGS. 3a and 3b, may cooperate with a plurality of similar gear and gear door actuation assemblies like assembly 12", however, this embodiment is sufficiently disclosed by reference to a single such gear and gear door assembly 12". The components of control 18" and assembly 12" are generally similar to the above-described embodiment shown in FIGS. 2a and 2b, with the most significant differences being in the electrical circuitry in control 18" and an electro-hydraulic operation of the latch 44", which conditions the safety valve 42" to safe actuator 36" when in the door opened position.

More specifically, with reference to FIG. 3a, control 18" includes a pilot command switch and indicator light module 100, a ground-crew command switch module 102, circuit breakers 104 and 106, a power relay 108, a latch relay 110, hydraulic pressure sensing switch 112, alternate extension pump and drive motor 18"c; and continuing on to FIG. 3b, an additional circuit breaker 114, a door close ground-crew command switch 116 and an electrical lead 118 adapted to receive a gear-up pilot command signal. Pilot command switch and indicator light module 100 includes a set of normally open contacts 100a and a set of normally closed contacts 100b. These contacts are responsive to a manual switch operation by the pilot to cause contacts 100a to momentarily complete a circuit to breaker 106 and 28 VDC supply and to momentarily open a circuit across the normally closed contacts 100b. Power relay 108 includes a relay coil 108a, a set of normally closed contacts 108b and a set of normally open contacts 108c, which are closed whenever coil 108a is energized. Coil 108a is connected in series with the normally open contacts 100a of pilot command module 100 to breaker 106, which, in turn, is connected to the 28 VDC supply. The normally open contacts 108c of relay 108 are connected in series between breaker 104, which is also connected to the 28 VDC supply and the pump drive motor 120 of the pump and motor assembly 18"c. Thus, when the pilot closes contacts 100a of module 100, applying 28 VDC supply to coil 108a of power relay 108, the normally open contacts 108c of the power relay are closed, energizing the pump drive motor 120 via circuit breaker 104.

Latch relay 110 includes a relay coil 110a, a set of normally open contacts 110b and a second set of normally open contacts 110c. Coil 110a is connected in parallel with coil 108a of power relay 108 so as to be energized therewith when the pilot closes contacts 100a of module 100. To latch the power relay in an energized state when contacts 100a are momentarily closed by the pilot, the normally open contacts 110c of latch relay 110 are connected in a series circuit with normally closed contacts 112a and a lead 122 that extends back to breaker 106 and, hence, to the 28 VDC supply to hold coils 108a and 110a of the relays energized as long as pressure switch 112 maintains contacts 112a closed. Another set of normally open contacts 110b of latch relay 110 are connected in series with lamp 100c of module 100 for turning the lamp on and holding it on as long as relay 110 is held in a latched, energized condition by pressure switch 112. Hydraulic fluid from the alternate extension pump circuit 20" is applied over dotted line 124 to a hydraulic to mechanical transducer 112b of switch 112 for opening contacts 112a when the pressure from the pump exceeds a predetermined level. The switching level of switch 112 is set to operate whenever the pressure in circuit 20" builds up to a level indicating that the alternative door release actuator 40" has completed its actuation stroke (see FIG. 3b).

Ground-crew switch module 102 includes a pair of normally open, independently operated, momentary contact switches 102a and 102b connected in series from breaker 106 through the normally closed contacts 100b of module 100. The door open command by the ground-crew is initiated by manual, concurrent operation of switch contacts 102a and 102b to complete the series circuit through the normally closed contacts 100b of module 100 to thereby energize relay coils 108a and 110a from the 28 VDC supply via circuit breaker 106. Thus, power relay 108 and the slaved operation of latch relay 110 are controlled by either the pilot actuation of the contacts 100a in module 100 or the ground-crew's concurrent operation of switch contacts 102a and 102b. Dual series contacts 102a and 102b are provided to reduce the probability of draining the power supply with a single switch failure. As discussed above, pilot command module 100 will normally be used only under backup, emergency conditions to effect gear extension when primary gear and gear door system has failed. Module 102, on the other hand, will be frequently, and on a scheduled basis, used by the ground-crew to open the gear doors of a grounded aircraft for maintenance.

With reference to FIG. 3b, a door closing ground-crew switch 116 has a set of normally open contacts which, when closed by ground-crew personnel, complete a circuit through breaker 114 to the 28 VDC supply for changing the condition of an electrically piloted hydraulic valve that is a part in an electro-hydraulic mechanical latch 44". Alternatively, a 28 VDC supply signal may be received on lead 118 from a switch on the pilot's gear-up handle for likewise operating the electrically piloted hydraulic valve of latch 44". Thus, latch 44" is responsive to either the ground-crew switch 116 or the pilot command signal on lead 118 to initiate the door closing sequence described above in connection with FIGS. 1a through 2b.

With reference to the gear and gear door actuation assembly 12" in FIG. 3b, the alternate extension hydraulic circuit 20" is applied to the door release actuator 40" and an associated hydraulic delay 80". Actuator 40" acts through a mechanical linkage 130 to release actuator lock 38", move safety valve 42", to its set, safe position and drive latch 44' to its latched condition. Hydraulic delay 80" operating in concert with actuator 40" produces a delayed hydraulic pressure over hydraulic line 132 for delayed operation of an alternate gear release actuator 134, which as mentioned above, is required on certain aircraft. Linkage 130 includes a push rod 130a for rotating actuator lock 38" in a counter-clockwise arc to release actuator 36" when actuator 40" is driven from left to right as viewed in the drawing. A vertically oriented and center pivoted lever 130b of linkage 130 is rotated in concert with the movement of push rod 130a to shift a mechanical pilot on safety valve 42" from right to left. Linkage 130 is also joined to an upwardly projecting lever arm 130c that is affixed to a rotating latching disk of latch 44". A tensioning spring 138 biases lever arm 130c and, hence, push rod 130a of linkage 130 towards the home position from right to left, as viewed in the drawing, so that when latch 44" is released, linkage 130 is shifted back against the unactuated piston of actuator 40" to restore lock 38" and valve 42" to their starting positions.

Safety valve 42" has two positions. A first position as it is shown in FIG. 3b communicates primary door closing hydraulic pressure over hydraulic line 140 through an open chamber of valve 42' to hydraulic line 142 which, in turn, is applied to the door closing end of door actuator 36". In the shifted position caused by lever 130b of linkage 130 in reaction to operation of actuator 40", valve 42" blocks the transmission of hydraulic fluid from line 140 to line 142 but permits, by a check valve 144, the reverse flow of fluid from hydraulic line 142 to return line 146. The reverse flow to return line 146 accommodates the return flow of fluid from the right-hand side of actuator 36" when the actuator piston is driven from left to right by either gravity force opening the door or by powered opening of the door by pressurized hydraulic fluid applied to line 148 connected to the door opening side of actuator 36". Thus, when linkage 130 is shifted form left to right by actuator 40" to release lock 38", valve 42" is also shifted to dispose check valve in the one-way blocking condition that prevents powered closing of the door by actuator 36". This one-way blocking condition is referred to as the set, safe condition of valve 42".

Latch 44" includes a latching disk 150 rotatably mounted on a support 160 for movement in response to left to right displacement of the upper end of lever arm 130c as described above. Disk 150 has a notch 152 that cooperates with a detent 162 on the end of an L-shaped detent arm 164 pivoted at the elbow. Arm 164 is biased by a tensioning spring 166 so as to force detent 162 upwardly into notch 152 when notch 152 is rotated into registration therewith. A lower end of the L-shaped arm 164 is stroked from right to left by a latch release hydraulic actuator 168 that in turn is controlled by an electrically piloted control valve 170. Actuator 168 has its actuator piston biased toward the right-hand position shown in FIG. 3b so that the piston is selectively driven against the spring bias from right to left. When actuator 168 thus drives the lower end of L-shaped catch arm 164 in a clockwise rotation, detent 162 is released from notch 152 on disk 150, freeing disk 150 and the upwardly projecting lever arm 130c to rotate under the bias of spring 138 back to the home position as it is shown in FIG. 3b, abutting the unactuated piston of actuator 40".

Control valve 170 of latch 44" includes an electrical pilot 172 that is connected to switch 116 and lead 118 of control 18" and shifts valve 170 between two positions that alternately communicate a piston driving chamber of actuator 168 with door closing hydraulic pressure on line 140, and with the unpressurized return line 146 of the primary hydraulic pressure system. Normally valve 170 will be resting in the position as shown in FIG. 3b communicating the return line 146 with the drive chamber of actuator 168 so that the actuator piston is allowed to return to its unactuated, home position as shown. Whenever an electrical signal is received via ground-crew switch 116 or from lead 118 in response to a pilot command signal, electrical pilot 172 responds to shift valve 170 to communicate door closing hydraulic pressure in line 140 to the drive chamber of actuator 168 forcing the actuator piston from right to left to strike and rotate arm 168 to release the latched condition of latch 44''. It is noted that the cooperation of electrically piloted valve 170, actuator 168, detent arm 164 and latching disk 150 co-function with the availability of hydraulic pressure in line 140 to release the latch only when such pressure is present at the instant that a door closing command signal is received via switch 116 or from lead 118. This operation provides the safety feature afforded by the latch and latch controlled valve in the first described embodiment.

While only particular embodiments have been disclosed herein, it will be readily apparent to persons skilled in the art that numerous changes and modifications can be made thereto, including the use of equivalent means and devices, without departing from the spirit of the invention.

The embodiments of the invention in which an exclusive property or privilege is claimed are defined as follows:

1. An integrated system for a pilot operated alternate extension control for a landing gear and associated gear door of an aircraft and a ground-crew operated door opening/closing control, comprising:
   hydraulic door actuator means having a door locked closed condition and a door released condition, said hydraulic door actuator means in its released condition being unrestrained to move from a door closed position to a door open position and being adapted to receive door closing hydraulic pressure to force the gear door from its door open position to its door locked closed position;
   door actuator lock means associated with said door actuator means and having locked and unlocked conditions that respectively dispose said hydraulic door actuator means in its door locked closed and door released conditions;
   an alternate lock release actuator means for moving said door actuator lock means from its locked condition to its unlocked condition in order to dispose said hydraulic door actuator means in its door released condition;
   safety valve means having a safe condition and an armed condition, said safety valve means normally assuring its armed condition and being interconnected with said alternate lock release actuator means so as to be disposed in said safe condition when said alternate lock release actuator moves said door actuator lock to its door released condition, said safety valve means in its safe condition blocking the receipt of said door closing hydraulic pressure by said hydraulic door actuator means;
   latch means for holding said safety valve means in its safe condition when said alternate lock release actuator means moves said safety valve means from its armed condition to its safe condition;
   pilot control means responsive to a pilot alternate release command to operate said alternate lock release actuator means so as to move said door actuator lock means to its unlocked condition thereby releasing said hydraulic door actuator means to release it for movement to said door open position; and
   ground-crew control means responsive to a ground-crew door open command to operate said alternate lock release actuator means to move said door actuator lock means between its locked condition and its unlocked condition, and said ground-crew control means responsive to a ground-crew door close command to unlatch said latch means when holding safety valve means in its safe position to enable said safety valve means to return to its armed condition.

2. The integrated system of claim 1, wherein said alternate lock release actuator means is a hydraulic actuator, and further comprising electro-hydraulic means responsive to said pilot control means and said ground-crew control means commands to supply alternate hydraulic fluid pressure to said alternate lock release actuator means.

3. The integrated system of claim 2, wherein said electrohydraulic means comprises:
   electrically driven, alternate extension hydraulic pump means having an on condition and an off condition; and,
   hydraulic pressure switch means connected to said electrically driven, alternate extension pump means for latching said pump means in its on condition and for unlatching said pump means to restore it to its off condition when hydraulic pressure produced by said pump means reaches a predetermined threshold.

4. The integrated system of claim 1, wherein said latch means has a normal, unlatched condition and a latched condition and is interconnected with said alternate lock release actuator means and said safety valve means, said latch means being responsive to actuation of said alternate lock release actuator means to undergo transition from said normal, unlatched condition to said latched condition, said latch means including electro-hydraulic valve means responsive to a door close command from said ground-crew control means to change from a latched condition to its normal, unlatched condition only when door closing hydraulic pressure is present to drive said door actuator means from its door opened position to its door locked closed position.

5. The integrated system of claim 4, wherein said safety valve means includes means for selectively blocking door closing hydraulic pressure to said door actuator means when said safety valve means is in its safe condition, and for communicating door closing hydraulic pressure to said door actuator means when said safety valve means is in its armed condition.

6. The integrated system of claim 2, wherein said pilot control means comprises means for producing an electrical control signal that activates said electro-hydraulic means to supply said alternate hydraulic fluid pressure to said alternate lock release actuator means, and wherein said ground-crew control means comprises means mounted on the underside of the aircraft's body for producing an electrical signal that activates said electro-hydraulic means to supply said alternate hydraulic fluid pressure to said alternate lock release actuator means.

7. An integrated alternate gear extension and ground-crew door opening/closing system of an aircraft comprising:

door actuator means including a door actuator lock;

an alternate lock release actuator means for being operated by hydraulic fluid under pressure for operating said door actuator lock between a locked condition and a released condition;

pilot control means for producing an alternate gear extension command signal;

ground-crew control means including means mounted on the body of the aircraft so as to be accessible to the ground-crew for producing a gear door open command signal; and door release means responsive to either said alternate gear extension command signal from said pilot control means, or to said ground-crew gear door open command signal for causing said alternate lock release actuator means to move said door actuator lock from said locked condition to said released condition, said door release means comprising an electrically powered alternate hydraulic pump for supplying alternate hydraulic fluid pressure to said alternate lock release actuator means.

8. The integrated system of claim 7, wherein said ground-crew control means includes means for producing a gear door closing command signal and said door actuator means is supplied by door closing hydraulic fluid from a primary hydraulic source, and further comprising safety valve means and cooperating latch means connected to said source of primary hydraulic pressure and said door actuator means for causing primary hydraulic fluid pressure to be applied to said door actuator means for closing the gear door in response to said gear door closing command signal produced by said ground-crew control means only if primary hydraulic fluid pressure is present at the same time as said gear door closing command signal.

9. The integrated system of claim 8, wherein said latch means comprises an electro-mechanical latch and a fluid pressure sensing switch means for preventing the unlatching of said latch means when said primary hydraulic fluid pressure is absent, and said safety valve means blocking door closing primary hydraulic fluid pressure from reaching said actuator means so long as said latch means is held in its latched condition.

10. The integrated system of claim 8, wherein said latch means is an electro-hydraulic mechanism that assumes a latched condition in response to movement of said alternate lock release actuator means from said locked condition to said released condition, and that is restored to an unlatched condition when there is a concurrence of a gear door closing command signal from said ground-crew control means and the presence of pressurized hydraulic fluid from said primary source.

* * * * *